US010439176B2

United States Patent
Choi et al.

(10) Patent No.: US 10,439,176 B2
(45) Date of Patent: Oct. 8, 2019

(54) BATTERY PACK INCLUDING MEMORY SLOT UNIT CONFIGURED TO INSERT MEMORY UNIT FOR FIRMWARE UPDATE OF BATTERY PACK

(71) Applicant: LG CHEM, LTD., Seoul (KR)

(72) Inventors: Yeo-Joo Choi, Daejeon (KR); Hyeon-Kyu Kim, Daejeon (KR); Bum-Hyun Lee, Daejeon (KR); Jae-Ki Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 60 days.

(21) Appl. No.: 15/701,949

(22) Filed: Sep. 12, 2017

(65) Prior Publication Data

US 2018/0076427 A1    Mar. 15, 2018

(30) Foreign Application Priority Data

Sep. 13, 2016   (KR) .................. 10-2016-0118086

(51) Int. Cl.
*H01M 2/10*      (2006.01)
*H01M 10/42*    (2006.01)

(52) U.S. Cl.
CPC ....... *H01M 2/1016* (2013.01); *H01M 2/1077* (2013.01); *H01M 10/425* (2013.01); *H01M 2010/4271* (2013.01); *H01M 2220/20* (2013.01)

(58) Field of Classification Search
CPC . H01M 2/1016; H01M 2/1077; H01M 10/425
USPC .......................................................... 429/7
See application file for complete search history.

(56) References Cited

U.S. PATENT DOCUMENTS

| 2003/0162083 | A1* | 8/2003 | Sakuma | H01M 2/0207 429/61 |
| 2003/0175560 | A1* | 9/2003 | Kim | H01M 10/4257 429/7 |
| 2011/0093840 | A1 | 4/2011 | Pynenburg et al. | |
| 2013/0023136 | A1* | 1/2013 | Kim | G06K 13/0825 439/153 |
| 2013/0288096 | A1* | 10/2013 | Frutschy | H01M 2/1088 429/99 |
| 2015/0194839 | A1* | 7/2015 | Wojcik | H01M 10/46 320/108 |
| 2016/0013827 | A1* | 1/2016 | Hubinak | G06F 3/017 455/558 |

(Continued)

FOREIGN PATENT DOCUMENTS

JP          3183281 U  *  5/2013
KR    20-1998-0015473 U    6/1998

(Continued)

OTHER PUBLICATIONS

Takeuchi K, Machine Translation of JP 3183281 U, May 2013 (Year: 2013).*

*Primary Examiner* — Sean P Cullen
(74) *Attorney, Agent, or Firm* — Morgan, Lewis & Bockius LLP (57) ABSTRACT

Disclosed is a battery pack, which includes at least one battery module, a pack case configured to package the at least one battery module, a BMS (Battery Management System) unit provided in the pack case to control the at least one battery module, and a memory slot unit electrically connected to the BMS unit and configured to insert a memory unit therein for firmware update of the battery pack.

15 Claims, 8 Drawing Sheets

(56) References Cited

U.S. PATENT DOCUMENTS

2016/0153626 A1* 6/2016 Ozaka ................... H02J 7/0031
362/86

FOREIGN PATENT DOCUMENTS

| KR | 19980015473 U * | 6/1998 | ............... H01H 5/06 |
| KR | 10-2012-0101004 A | 9/2012 | |
| KR | 10-1468314 B1 | 12/2014 | |
| KR | 10-2015-0066222 A | 6/2015 | |
| WO | WO-2014132212 A1 * | 9/2014 | ............. G06F 3/017 |

* cited by examiner

BATTERY PACK INCLUDING MEMORY SLOT UNIT CONFIGURED TO INSERT MEMORY UNIT FOR FIRMWARE UPDATE OF BATTERY PACK

TECHNICAL FIELD

The present disclosure relates to a battery pack.

The present application claims priority to Korean Patent Application No. 10-2016-0118086 filed on Sep. 13, 2016 in the Republic of Korea, the disclosures of which are incorporated herein by reference.

BACKGROUND ART

A secondary battery, which is easily applied to various product groups and has electrical characteristics such as high energy density, is universally applied not only for a portable device but also for an electric vehicle (EV) or a hybrid electric vehicles (HEV), an energy storage system or the like, which is driven by an electric driving source. The secondary battery is attracting attention as a new environment-friendly energy source for improving energy efficiency since it gives a primary advantage of reducing the use of fossil fuels and also does not generate by-products by the use of energy at all.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.2V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. Here, depending on various voltage and capacity requirements, the battery pack including at least one battery module may be used for a home, or battery racks including at least one battery pack may be combined to configure a power storage device for industrial use.

The conventional battery pack includes at least one battery module, a pack case for packaging at least one battery module, and a BMS (Battery Management System) unit for controlling at least one battery module. Here, firmware update may be performed periodically or permanently at the BMS unit in order to improve the control performance of the battery pack.

In the conventional battery pack, when the firmware update is performed, a worker or the like firstly disassembles the pack case of the battery pack, and then a separate cable for updating is connected to the BMS unit. In other words, in this update method, the pack case of the battery pack should be dissembled whenever the firmware update is performed, and an additional cable connection should be performed for updating.

Accordingly, when the firmware update is performed, if the battery pack is used for home use, it is very difficult for a user or the like to perform the updating work alone, and thus the user is highly likely to depend on a professional worker or the like of an installation company at every updating.

Therefore, it is required to find a way to provide a battery pack that may improve the working efficiency and user convenience when firmware update is performed for a battery pack.

DISCLOSURE

Technical Problem

The present disclosure is designed to solve the problems of the related art, and therefore the present disclosure is directed to providing a battery pack, which may improve the working efficiency and user convenience when firmware update is performed for a battery pack.

Technical Solution

In one aspect of the present disclosure, there is provided a battery pack, comprising: at least one battery module; a pack case configured to package the at least one battery module; a BMS (Battery Management System) unit provided in the pack case to control the at least one battery module; and a memory slot unit electrically connected to the BMS unit and configured to insert a memory unit therein for firmware update of the battery pack.

The memory slot unit may be mounted between the BMS unit and the pack case at an inside of the pack case and may be partially exposed out of the pack case when the memory unit is inserted.

The memory slot unit may include: a slot body mounted to the BMS unit to be electrically connected to the BMS unit; and an insert slot formed in the slot body so that the memory unit is inserted therein.

The pack case may include: a case body configured to accommodate the at least one battery module; and a case cover coupled to the case body to cover the BMS unit, wherein the memory slot unit may be disposed between the BMS unit and the case cover.

The slot body may be mounted to a top surface of the BMS unit, and the top surface of the slot body may be disposed adjacent to an inner wall of a bottom portion of the case cover.

The insert slot may be exposed out of the case cover when the memory unit is inserted.

The case cover may have a slot opening formed at an upper side of the insert slot to open the insert slot when the memory unit is inserted.

The battery pack may further comprise a slot cover configured to cover the slot opening, the slot cover exposing the insert slot out of the case cover when the memory unit is inserted.

The slot cover may be provided to be rotatable in a horizontal direction of the case cover, and may be separated from the case cover or fixed to the case cover according to the rotation.

At least one sliding rib rotatably mounted to the case cover may be provided at a bottom surface of the slot cover.

A rotation guide rail disposed to surround the slot opening may be formed at the case cover to guide the rotation of the at least one sliding rib.

The case cover may include at least one rib separating groove formed at the rotation guide rail to separate the at least one sliding rib from the rotation guide rail.

At least one stopper protrusion for preventing the movement of the slot cover when the case cover is fixed to the slot cover may be formed at a bottom surface of the slot cover.

At least one stopper groove may be formed at the case cover so that the at least one stopper protrusion is inserted therein or separated therefrom according to the rotation of the slot cover.

The case cover may include at least one rotation guide groove for guiding a rotation range of the at least one stopper protrusion when the slot cover rotates, and the at least one stopper groove may be provided at a bottom surface of the at least one rotation guide groove.

Advantageous Effects

According to various embodiments as above, it is possible to provide a battery pack, which may improve the working efficiency and user convenience when firmware update is performed for a battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
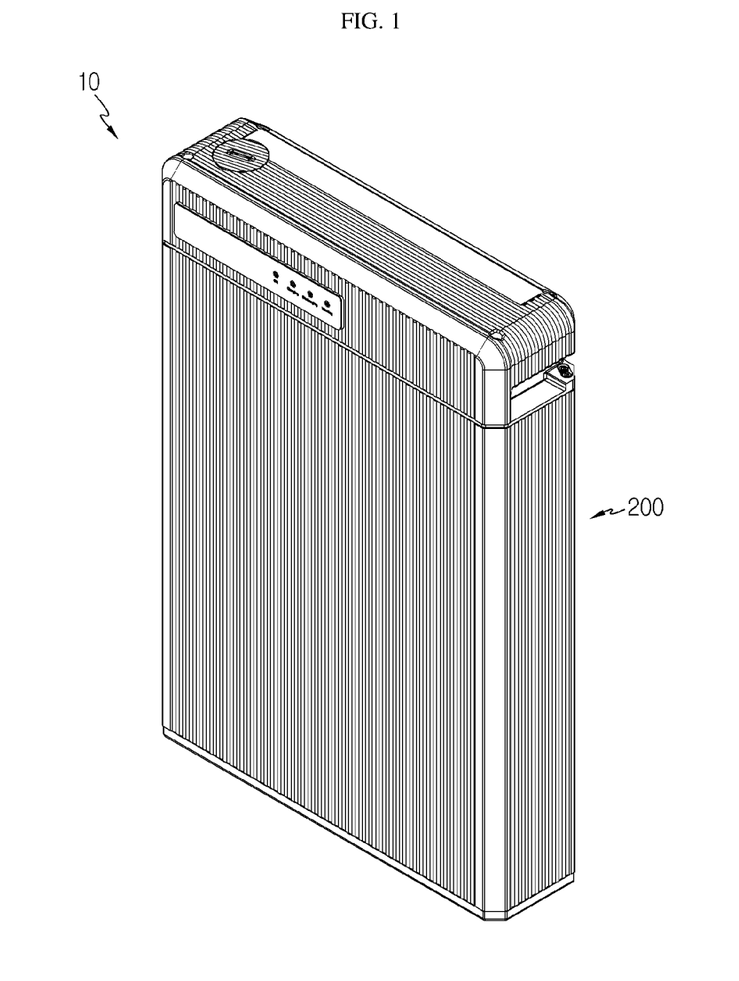
FIG. 1 is a diagram for illustrating a battery pack according to an embodiment of the present disclosure.
Figure 2:
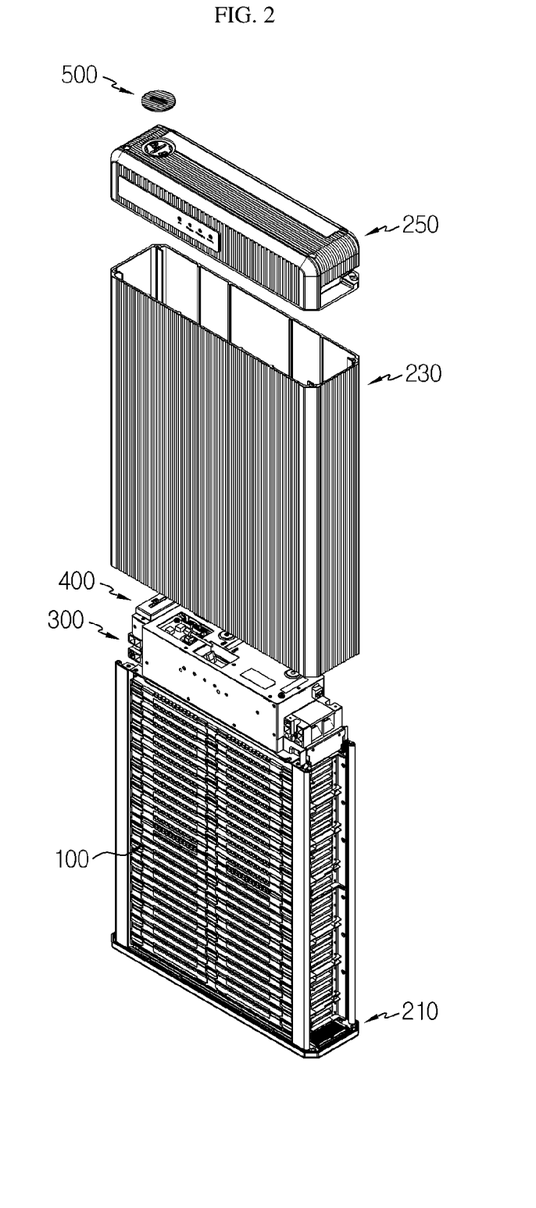
FIG. 2 is an exploded perspective view showing the battery pack of FIG. 1.
Figure 3:
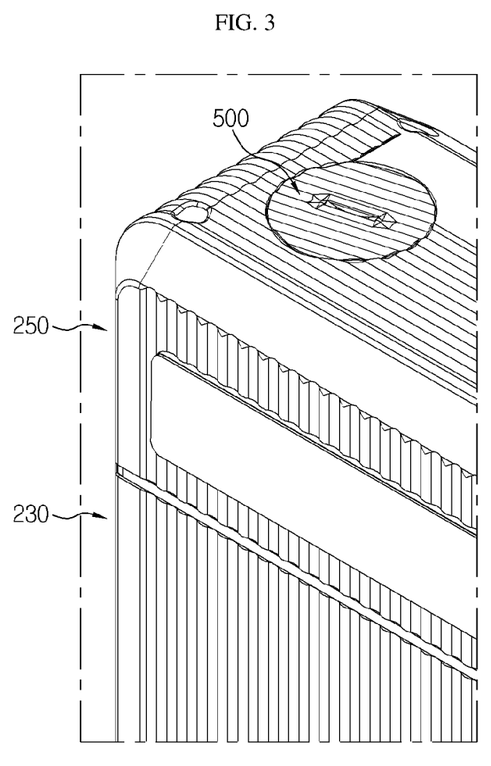
FIG. 3 is a diagram for illustrating essential parts of battery pack of FIG. 1.
Figure 4:
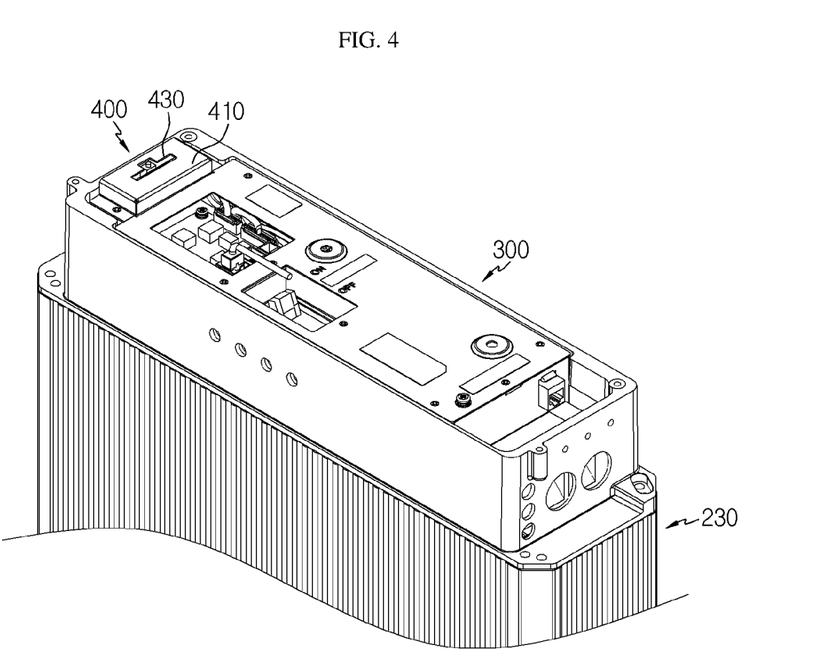
FIG. 4 is a diagram showing the battery pack of FIG. 1, from which a case cover of a pack case is excluded.
Figure 5:
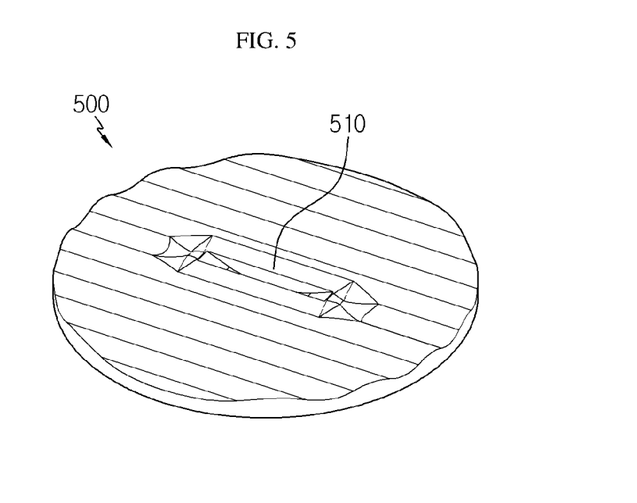
FIGS. 5 to 8 are diagrams for illustrating a slot cover of the battery pack of FIG. 1.
Figure 6:
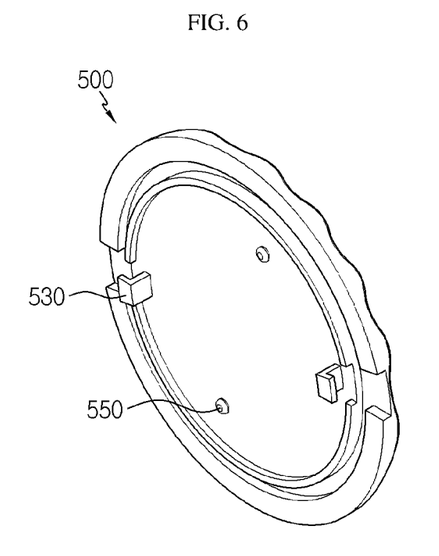
Figure 7:
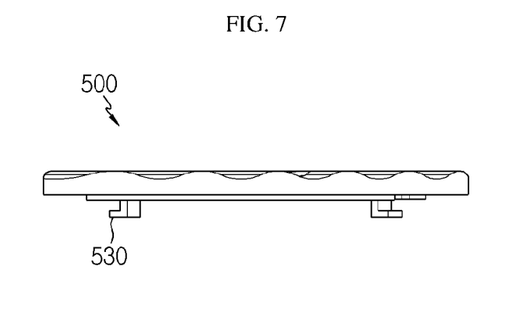
Figure 8:
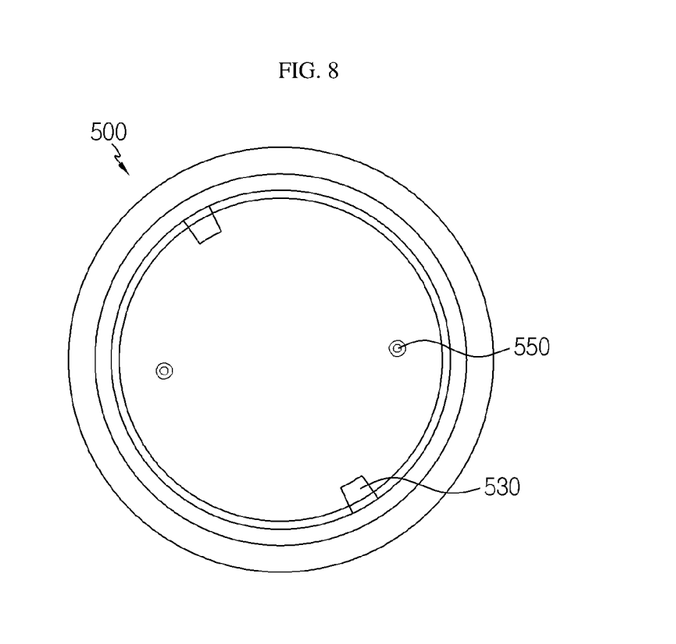
Figure 9:
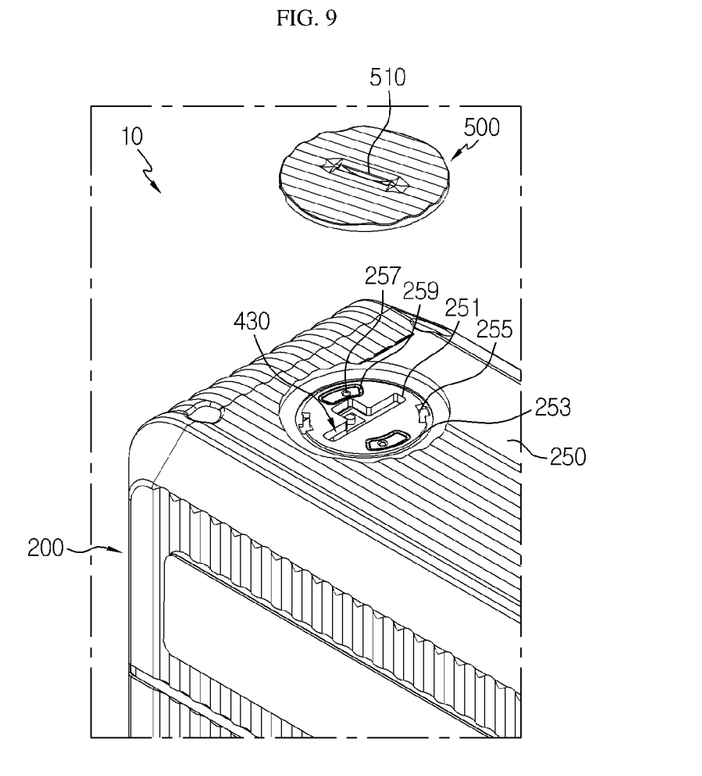
FIGS. 9 and 10 are diagrams for illustrating firmware update for the battery pack of FIG. 1.
Figure 10:
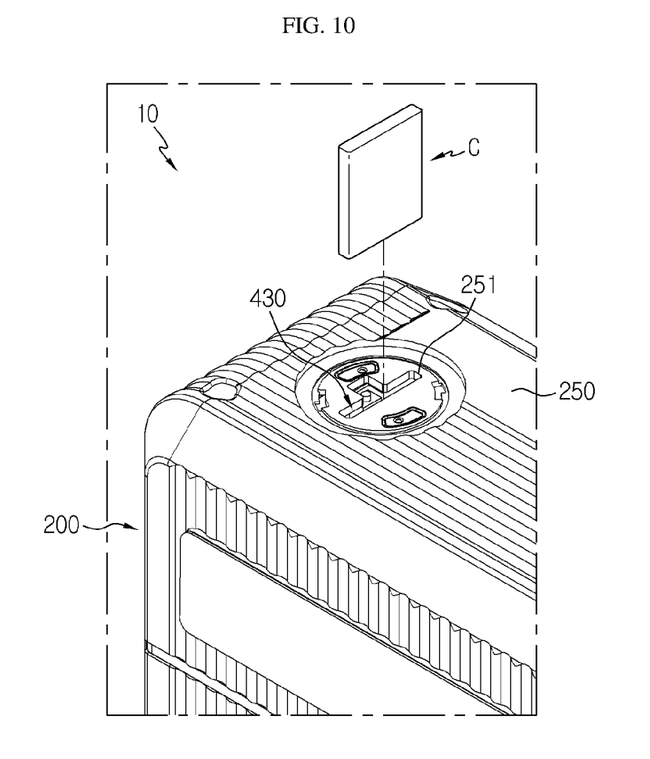

FIG. 1 is a diagram for illustrating a battery pack according to an embodiment of the present disclosure, FIG. 2 is an exploded perspective view showing the battery pack of FIG. 1, FIG. 3 is a diagram for illustrating essential parts of battery pack of FIG. 1, FIG. 4 is a diagram showing the battery pack of FIG. 1, from which a case cover of a pack case is excluded, FIGS. 5 to 8 are diagrams for illustrating a slot cover of the battery pack of FIG. 1, and FIGS. 9 and 10 are diagrams for illustrating firmware update for the battery pack of FIG. 1.

Referring to FIGS. 1 to 10, a battery pack 10 may be used as an energy source or an energy storage device for a home or industry, and may also be used as an energy source for vehicles such as electric vehicles or hybrid vehicles that have recently attracting attention. Hereinafter, this embodiment will be explained based on the case where the battery pack 10 is used as an energy storage device for a home.

The battery pack 10 may include a battery module 100, a pack case 200, a BMS unit 300, a memory slot unit 400, and a slot cover 500.

At least one battery module 100 or a plurality of battery modules 100 may be provided. Hereinafter, this embodiment will be explained based on the case where a plurality of the battery modules 100 are provided.

Each of the plurality of battery modules 100 may include at least one battery cell. At least one battery cell may be a secondary battery, for example, a pouch-type secondary battery.

The pack case 200 may package at least one battery module 100, or in this embodiment, the plurality of battery modules 100. The pack case 200 may include a case base 210, a case body 230, and a case cover 250.

The case base 210 may support the plurality of battery modules 100. The case base 210 may have a substantially plate shape and may form a bottom portion of the pack case 200.

The case body 230 may be coupled to the case base 210 to form an accommodation space which may accommodate the at least one battery module 100, or in this embodiment, the plurality of battery modules 100.

The case cover 250 may be coupled to the case body 230 and cover the BMS unit 300, explained later. This case cover 250 may form a top portion of the pack case 200.

The case cover 250 may include a slot opening 251, a rotation guide rail 253, a rib separating groove 255, a stopper groove 257, and a rotation guide groove 259.

The slot opening 251 is formed above an insert slot 430, explained later, and may open the insert slot 430 when a memory unit C, explained later, is inserted. The slot opening 251 may have a shape corresponding to the insert slot 430 so that the memory unit C may be smoothly inserted.

The rotation guide rail 253 is for guiding the rotation of a sliding rib 530 of the slot cover 500, explained later. The rotation guide rail 253 may be formed at a top surface of the case cover 250 and be disposed to surround the slot opening 251.

The rib separating groove 255 is formed in the rotation guide rail 253 and may separate the sliding rib 530 of the slot cover 500, explained later, from the rotation guide rail 253.

The rib separating groove 255 may be provided in a number corresponding to the number of the sliding ribs 530, explained later, and may be provided in pairs in this embodiment. The pair of rib separating grooves 255 may be disposed to face each other with the slot opening 251 being interposed therebetween.

The stopper groove 257 may allow at least one stopper protrusion 550, explained later, to be placed therein so as to be fixed according to the rotation of the slot cover 500, explained later. The stopper groove 257 may be provided in a number corresponding to the number of the stopper protrusions 550, explained later, and may be provided as a pair in this embodiment.

The pair of stopper grooves 257 may be disposed to face each other with the slot opening 251 being interposed therebetween. A pair of stopper protrusions 550, explained later, may be inserted or separated according to the rotation of the slot cover 500, explained later.

The rotation guide grooves 259 may be provided in a pair, and the stopper grooves 257 may be respectively provided at a bottom surface of the pair of rotation guide grooves 259. The pair of rotation guide grooves 259 may guide a rotation range of the pair of stopper protrusions 550, explained later, when the slot cover 500, explained later, is rotated. In detail, the pair of rotation guide grooves 259 may limit the rotation of the pair of stopper protrusions 550, explained later, within a predetermined range.

The BMS unit 300 is provided in the pack case 200 to control controlling at least one battery modules 100, or in this embodiment, the plurality of battery modules 100, and the BMS unit 300 may be electrically connected to the plurality of battery modules 100.

The BMS unit 300 may be mounted to an upper side of a battery module 100 provided at an uppermost side among the plurality of battery modules 100 in the pack case 200 and be disposed above the case body 230 of the pack case 200.

The memory slot unit 400 is electrically connected to the BMS unit 300, and the memory unit C for firmware update of the BMS unit 300 of the battery pack 10 may be inserted therein. Here, the memory unit C is a medium used for the firmware update and may be provided as an SD card, which is a removable memory.

The memory slot unit 400 may be disposed between the BMS unit 300 and the pack case 200 inside the pack case 200 and be partially exposed out of the pack case 200 when the memory unit C is inserted.

Hereinafter, the memory slot unit 400 will be described in more detail.

The memory slot unit 400 may include a slot body 410 and an insert slot 430.

The slot body 410 may be mounted to the BMS unit 300 to be electrically connected to the BMS unit 300. In detail, the slot body 410 is mounted to a top surface of the BMS unit 300, and the top surface of the slot body 410 may be disposed adjacent an inner wall of the bottom portion of the case cover 250. This is to allow the insert slot 430, explained later, to be disposed immediately below the slot opening 251 of the case body 230. Accordingly, when the memory unit C is inserted into the insert slot 430, explained later, the memory unit C may be inserted directly into the insert slot 430, explained later, immediately after passing through the slot opening 251.

The insert slot 430 may be formed in the top surface of the slot body 410. The memory unit C may be inserted into the insert slot 430. The insert slot 430 may be exposed out of the case cover 250 when the memory unit C is inserted. Accordingly, a user may mount the memory unit C to the memory slot unit 400 without any complicated operation for separating the case cover 250 from the case body 230.

The slot cover 500 fits in a port and covers the slot opening 251 of the case cover 250, and when the memory unit C is inserted by the user or the like, the slot opening 251 may be opened so that the insert slot 430 is exposed out of the case cover 250.

For this, the slot cover 500 may be detachably mounted to the case cover 250. In detail, the slot cover 500 may be provided to be rotatable in a horizontal direction of the case cover 250 so as to be separated from the case cover 250 or fixed to the case cover 250 according to the rotation.

The slot cover 500 may include a user manipulating guider 510, a sliding rib 530, and a stopper protrusion 550.

The user manipulating guider 510 is for guiding user manipulation for rotating the slot cover 500 and may be provided at the top surface of the slot cover 500. The user manipulating guider 510 may have a groove of a predetermined depth so that the user manipulating guider 510 may be rotated by inserting a coin or the like therein. The user manipulating guider 510 may also have any other shape or structure capable of guiding easy user manipulation for rotating the slot cover 500, without being limited thereto.

The sliding rib 530 is provided at the bottom surface of the slot cover 500 and may be rotatably mounted on the case cover 250. The sliding rib 530 may be provided in a pair.

The pair of sliding ribs 530 may be rotatably mounted along the rotation guide rail 253 of the case cover 250 and may be separated from the rotation guide rail 253 at the pair of rib separating grooves 256 of the case cover 250 according to the rotation.

Likewise, the pair of sliding ribs 530 may be interposed into the rotation guide rail 253 and mounted to the case cover 250 at the pair of rib separating grooves 256 according to the rotation.

The stopper protrusion 550 is provided at the bottom surface of the slot cover 500, and when the slot cover 500 is fixed to the case cover 250, the stopper protrusion 550 may prevent the slot cover 500 from moving. The stopper protrusion 550 may be provided in a pair.

The pair of stopper protrusions 550 may be inserted into and fixed to the pair of stopper grooves 257 according to the rotation of the slot cover 500 or be rotated within a predetermined range along the pair of rotation guide grooves 259.

Hereinafter, a user manipulation mechanism for the firmware update of the battery pack 10 according to this embodiment will be described.

First, in the battery pack 10, the slot opening 251 which exposes the insert slot 430 out of the pack case 200 by the slot cover 500 may be blocked by the slot cover 500. This is to prevent moisture or impurities from penetrating through the slot opening 251. The slot cover 500 may be selectively separated from the case cover 250 according to user manipulation only during the firmware update.

At the firmware update of the battery pack 10, the user may firstly separate the slot cover 500 from the case cover 250. In order to separate the slot cover 500, the user may detach the slot cover 500 from the case cover 250 by rotating the slot cover 500. If the slot cover 500 is separated, the insert slot 430 of the memory slot unit 400 may be exposed out of the pack case 200.

After that, the user may insert the memory unit C for the firmware update into the insert slot 430 of the memory slot unit 400 and perform the firmware update of the BMS unit 300 of the battery pack 10.

As described above, in the battery pack 10 according to this embodiment, the memory unit C provided as a SD card is inserted the memory slot unit 400, instead of a conventional separate cable, and thus the firmware update may be performed more simply.

In addition, in the battery pack 10 according to this embodiment, when the firmware update is performed, only the slot cover 500 is separated, instead of disassembling the pack case 200, and thus the firmware update may be performed much easier. Accordingly, in this embodiment, an individual user may easily perform the update work without a professional worker of an installation company.

Therefore, the battery pack 10 according to this embodiment may significantly improve work efficiency and user convenience when the firmware update of the battery pack 10 is performed.

While the embodiments of the present disclosure have been shown and described, it should be understood that the present disclosure is not limited to the specific embodiments described, and that various changes and modifications can be made within the scope of the present disclosure by those

| Reference Signs | |
|---|---|
| 10: battery pack | 100: battery module |
| 200: pack case | 210: case base |
| 230: case body | 250: case cover |
| 251: slot opening | 253: rotation guide rail |
| 256: rib separating groove | 257: stopper groove |
| 259: rotation guide groove | 300: BMS unit |
| 400: memory slot unit | 410: slot body |
| 430: insert slot | 500: slot cover |
| 510: user manipulating guider | 530: sliding rib |
| 550: stopper protrusion | |

What is claimed is:

1. A battery pack configured to receive a firmware update, comprising:
 at least one battery module;
 a pack case configured to package the at least one battery module;
 a BMS (Battery Management System) unit provided in the pack case to control the at least one battery module, the BMS unit having a firmware; and
 a memory slot unit electrically connected to the BMS unit, the memory slot unit being configured to receive a removable therein for update of the firmware of the battery pack,
 wherein the firmware of the battery pack is updated in response to a firmware update received from the removable memory when the removable memory is received in the memory slot unit,
 wherein the memory slot unit is mounted between the BMS unit and the pack case at an inside of the pack case; and
 the pack case includes a port configured to seal a side of the pack case in a closed configuration, and partially expose the memory slot unit to an outside of the pack case in an open configuration,
 wherein the memory slot unit includes:
  a slot body mounted to the BMS unit, the slot body being electrically connected to the BMS unit; and
  an insert slot in the slot body configured to receive the removable memory therein.

2. The battery pack according to claim 1, wherein the pack case includes:
 a case body configured to accommodate the at least one battery module; and
 a case cover coupled to the case body to cover the BMS unit,
 wherein the memory slot unit is between the BMS unit and the case cover, and
 wherein the port is in the case cover.

3. The battery pack according to claim 2, wherein:
 the slot body is mounted to a top surface of the BMS unit; and
 a top surface of the slot body is adjacent to an inner wall of a bottom portion of the case cover.

4. The battery pack according to claim 2, wherein the port is further configured to expose the insert slot to an outside of the case cover in the open configuration.

5. The battery pack according to claim 4, wherein the case cover includes a slot opening in the port at an upper side of the insert slot and configured to open the insert slot.

6. The battery pack according to claim 5, further comprising a slot cover configured to cover the slot opening in the port, the slot cover being configured to expose the insert slot to the outside of the case cover.

7. The battery pack according to claim 6, wherein the slot cover includes a user manipulating guider including a groove on a top surface of the slot cover configured to receive an object for rotating the slot cover.

8. The battery pack according to claim 6, wherein the case cover is configured to be separable from the case body.

9. The battery pack according to claim 6, wherein:
 the slot cover is configured to be rotatable in a horizontal direction of the case cover; and
 the slot cover is configured to be separated from the case cover or fixed to the case cover according to a rotation of the slot cover.

10. The battery pack according to claim 9, wherein at least one sliding rib rotatably mounted to the case cover is at a bottom surface of the slot cover.

11. The battery pack according to claim 10, wherein a rotation guide rail surrounding the slot opening is at the case cover to guide the rotation of the at least one sliding rib.

12. The battery pack according to claim 11, wherein the case cover further includes at least one rib separating groove at the rotation guide rail and configured to separate the at least one sliding rib from the rotation guide rail.

13. The battery pack according to claim 9, wherein at least one stopper protrusion configured to prevent the movement of the slot cover when the case cover is fixed to the slot cover is at a bottom surface of the slot cover, the stopper protrusion being on an inner surface of the slot cover.

14. The battery pack according to claim 13, wherein at least one stopper groove is at the case cover, the stopper groove being configured to receive the at least one stopper protrusion therein according to the rotation of the slot cover.

15. The battery pack according to claim 14, wherein:
 the case cover further includes at least one rotation guide groove configured to guide a rotation range of the at least one stopper protrusion when the slot cover rotates; and
 the at least one stopper groove is at a bottom surface of the at least one rotation guide groove.

* * * * *